No. 663,038. Patented Dec. 4, 1900.
J. McLAUGHLIN.
DOUGH MIXER.
(Application filed Apr. 12, 1900.)
(No Model.)
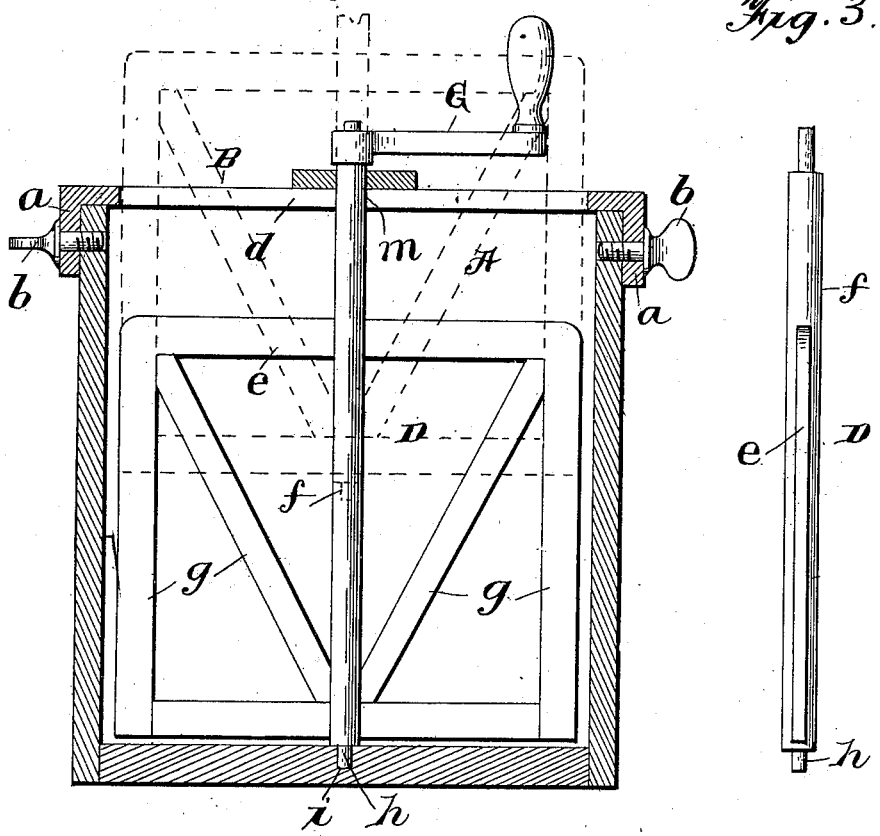
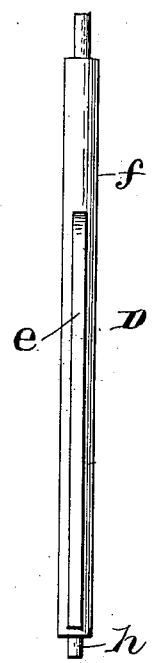
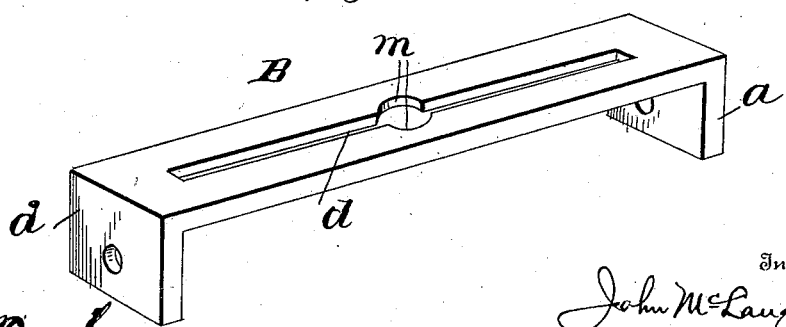
Witnesses
Geo. E. Frech.
Chas. R. Wright Jr.
Inventor
John McLaughlin,
by A. S. Pattison,
Attorney.

UNITED STATES PATENT OFFICE.

JOHN McLAUGHLIN, OF GLOUCESTER, MASSACHUSETTS.

DOUGH-MIXER.

SPECIFICATION forming part of Letters Patent No. 663,038, dated December 4, 1900.

Application filed April 12, 1900. Serial No. 12,593. (No model.)

*To all whom it may concern:*

Be it known that I, JOHN MCLAUGHLIN, a citizen of the United States, and a resident of Gloucester, in the county of Essex and State of Massachusetts, have invented new and useful Improvements in Dough-Mixers, of which the following is a specification.

My invention relates to improvements in dough-mixers, and pertains to a mixer which has a combined bearing and scraper frame for the mixing-dasher, all of which will be fully described hereinafter and particularly pointed out in the claims.

The object of my invention is to provide a dough-mixer in which a combined bearing and scraping frame is attached to the vessel or tub in which the dough is to be mixed, the bearing-frame being provided with a longitudinal opening and the dasher of a size to pass snugly through the said longitudinal opening or slot, whereby after the dough has been mixed the removal of the dasher from the tub or vessel will scrape the dough therefrom, thus doing away with the necessity of the use of the hand for either the mixing of the dough or the removing of the same from the mixing-dasher.

In the accompanying drawings, Figure 1 is a vertical central sectional view of a dough-mixer embodying my invention. Fig. 2 is a detached perspective view of the combined bearing and scraping frame. Fig. 3 is a detached edge elevation of the mixing-dasher.

Referring now to the drawings, A indicates a tub or other vessel which will be of the desired size, according to the amount of dough the machine is intended to mix.

Extending across the upper open end of the tub or vessel A is a combined bearing and dasher-scraper frame B, the said scraper and bearing frame being in side elevation essentially U-shaped, the depending portions $a$ thereof having clamping-screws $b$ passing therethrough and adapted to engage the outer side of the vessel A for the purpose of securing it in position thereon.

By reference particularly to Fig. 2 it will be seen that the bearing and scraper frame B is provided with a longitudinal slot $d$, and by reference to Fig. 1 it will be seen that this slot $d$ is of a length slightly greater or at least equal to the width of the mixing-dasher D.

The mixing-dasher D is provided with wings of any desired form, the dasher being here shown as essentially of a rectangular frame $e$, divided in the center by the supporting-shaft $f$ and extending diagonally at each side of the shaft for the parallel blades $g$.

The lower end of the shaft $f$ has a downwardly-extending bearing-pintle $h$, adapted to rest in a suitable bearing-recess $i$, formed in the bottom of the tub or vessel, and the upper end of the shaft $f$ projects through the bearing-frame B, the said bearing-frame provided with curved portions $m$, adapted to receive the shaft $f$ and to form a bearing for the upper end thereof. The upper end of the shaft $f$ is constructed to receive an operating-crank G where the machine is to be operated by hand.

The machine is adapted to be made of various sizes—that is, of a size for domestic or family use and of sizes suitable for the use of bakers. In the latter event there will preferably be provision made for driving the machine by steam, water, or electric power; but as this part of the device may be varied to suit the conditions it forms no part of my present invention.

From the foregoing description it will be noted that after the dough has been mixed the dasher and the shaft are readily vertically movable through the combined bearing and scraper frame B, and when removed therethrough the frame serves to scrape from the dasher the adhering dough. After the dasher has been removed from the tub or vessel A the bearing or scraper frame may or may not be removed therefrom and the vessel then covered and set away until it is desired to use the mixed dough.

It will be noted that the bearing and scraper frame being removable from the vessel A the dasher and the bearing and scraper frame may be used in connection with several tubs or vessels A at different periods, if desired.

By means of a mixer, as herein shown and described, I provide a simple and cheap arrangement which will automatically remove the adhering dough from the dasher when it is removed from the machine.

Having thus described my invention, what I claim, and desire to secure by Letters Patent, is—

1. A dough-mixer comprising a vessel, a combined bearing and scraper frame extending across the upper open end thereof and connected thereto, a mixing-dasher having a projecting shaft, the said bearing and scraper frame having a longitudinal slot of a length equal to the width of the dasher and of a width equal to the thickness of the dasher whereby the dasher may be moved vertically therethrough, substantially as described.

2. A dough-mixer comprising a vessel or tub, a dasher therein provided with a projecting operating-shaft, and a combined bearing and scraper frame connected to the upper end and extending across the vessel or tub, the said bearing and scraper frame having a longitudinal slot of a size to permit the passage of the dasher therethrough, and the opposite sides of the center of the said slot provided with curved portions to provide a bearing for the said shaft, whereby when the dasher is withdrawn the bearing-frame will perform the action of a scraper for removing the dough therefrom, substantially as described.

3. A combined bearing and scraper frame for dough-mixers comprising a frame provided with vessel-attaching members and with a longitudinal slot extending thereacross, substantially as described.

In testimony whereof I have hereunto set my hand in the presence of two subscribing witnesses.

JOHN McLAUGHLIN.

Witnesses:
   FRANK E. SMOTHERS,
   CYRUS STORY.